(12) United States Patent
Coffin

(10) Patent No.: US 10,921,554 B2
(45) Date of Patent: Feb. 16, 2021

(54) MIRROR BEARING FOR AN INTERFEROMETER

(71) Applicant: Thermo Electron Scientific Instruments LLC, Madison, WI (US)

(72) Inventor: John Magie Coffin, Blue Mounds, WI (US)

(73) Assignee: Thermo Electron Scientific Instruments LLC, Madison, WI (US)

(*) Notice: Subject to any disclaimer, the term of this patent is extended or adjusted under 35 U.S.C. 154(b) by 301 days.

(21) Appl. No.: 16/034,970

(22) Filed: Jul. 13, 2018

(65) Prior Publication Data

US 2019/0018219 A1  Jan. 17, 2019

Related U.S. Application Data

(60) Provisional application No. 62/532,446, filed on Jul. 14, 2017.

(51) Int. Cl.

| | |
|---|---|
| *G02B 26/08* | (2006.01) |
| *G02B 7/182* | (2021.01) |
| *H02K 41/035* | (2006.01) |
| *G01J 3/06* | (2006.01) |
| *G01J 3/02* | (2006.01) |
| *G01J 3/453* | (2006.01) |

(52) U.S. Cl.
CPC .......... *G02B 7/1828* (2013.01); *G01J 3/0202* (2013.01); *G01J 3/06* (2013.01); *G01J 3/4535* (2013.01); *H02K 41/0356* (2013.01)

(58) Field of Classification Search
CPC ..... G02B 7/1828; H02K 41/0356; G01J 3/06; G01J 3/0202; G01J 3/4535

USPC ....................................................... 359/200.1
See application file for complete search history.

(56) References Cited

U.S. PATENT DOCUMENTS

| | | | |
|---|---|---|---|
| 5,883,712 A * | 3/1999 | Coffin | G01J 3/06 356/452 |
| 5,896,197 A | 4/1999 | Coffin | |

(Continued)

OTHER PUBLICATIONS

International Search Report and Written Opinion for Application No. PCT/US2018/042043, dated Nov. 21, 2018, 10 pages.

(Continued)

*Primary Examiner* — Euncha P Cherry
(74) *Attorney, Agent, or Firm* — William R. McCarthy, III

(57) ABSTRACT

Aspects of the present disclosure are directed to a mirror bearing for an interferometer. An example mirror bearing includes a stationary mounting member and a mobile mirror assembly configured for slidable movement relative to the mounting member along its longitudinal axis. The mounting member is configured for rigid attachment to an interferometer body. A bore extends through the mounting member along its longitudinal axis. A drive coil receiving area of the mounting member is configured to hold a drive coil coupled thereto. The mobile mirror assembly includes a tube configured to receive, at one end of the tube, an end of the mounting member. The mobile mirror assembly also includes a mirror coupled to the opposite end of the tube. A drive magnet is disposed within the tube and is configured to be received within the bore of the mounting member when the mirror bearing is in an assembled configuration.

22 Claims, 7 Drawing Sheets

(56) References Cited

U.S. PATENT DOCUMENTS 9,068,599 B2 6/2015 Iverson
2010/0027092 A1* 2/2010 van Os .............. H02K 41/0356
359/223.1

OTHER PUBLICATIONS

International Preliminary Report on Patentability for Application No. PCT/2018/042043, dated Jan. 23, 2020, 9 pages.

* cited by examiner

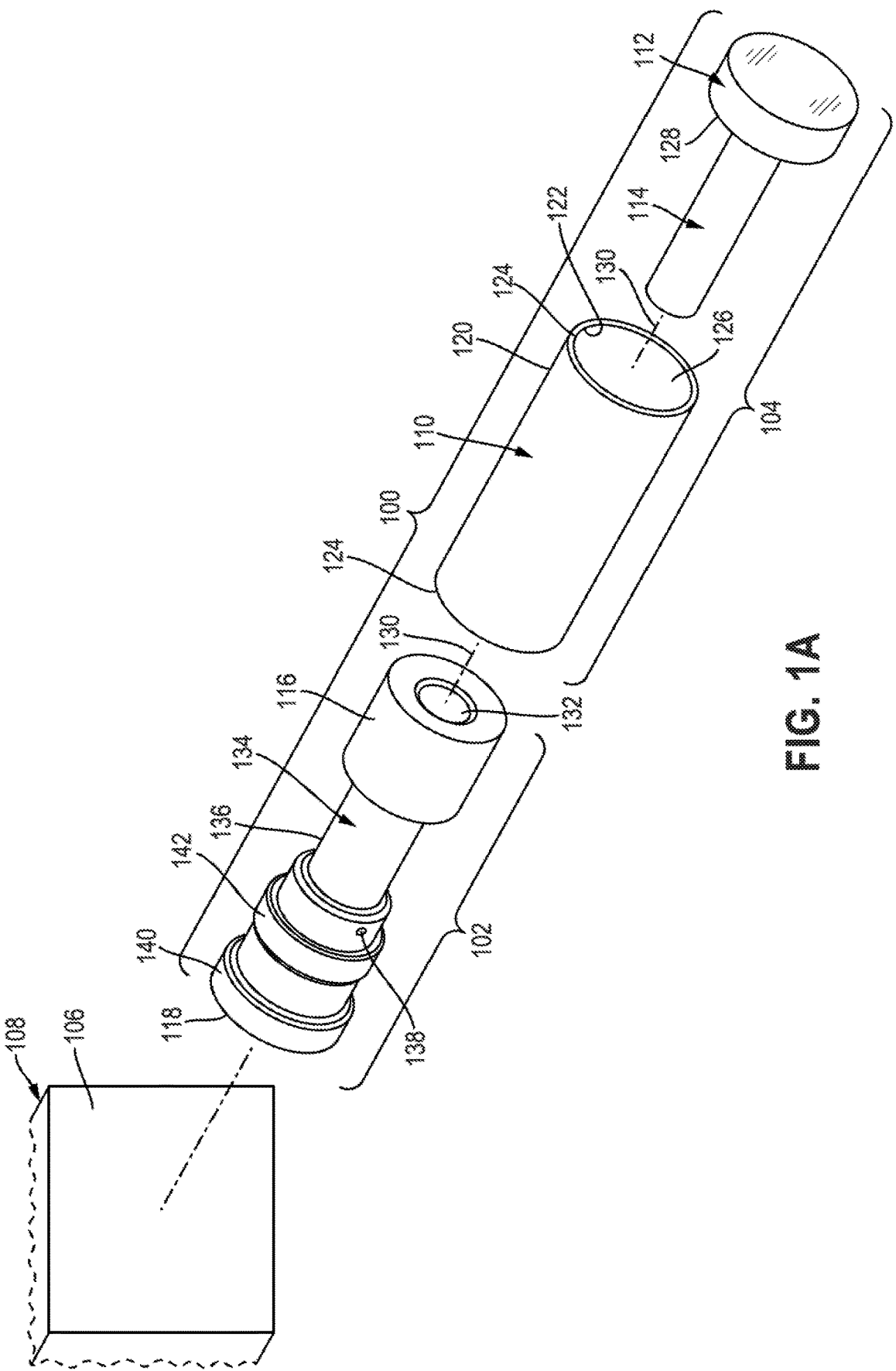

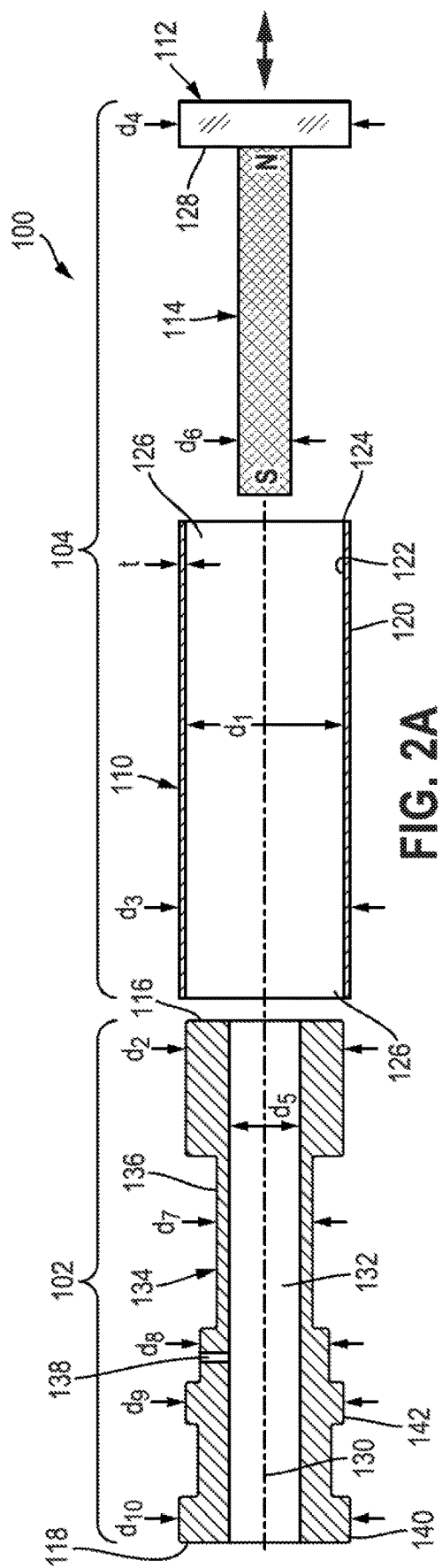

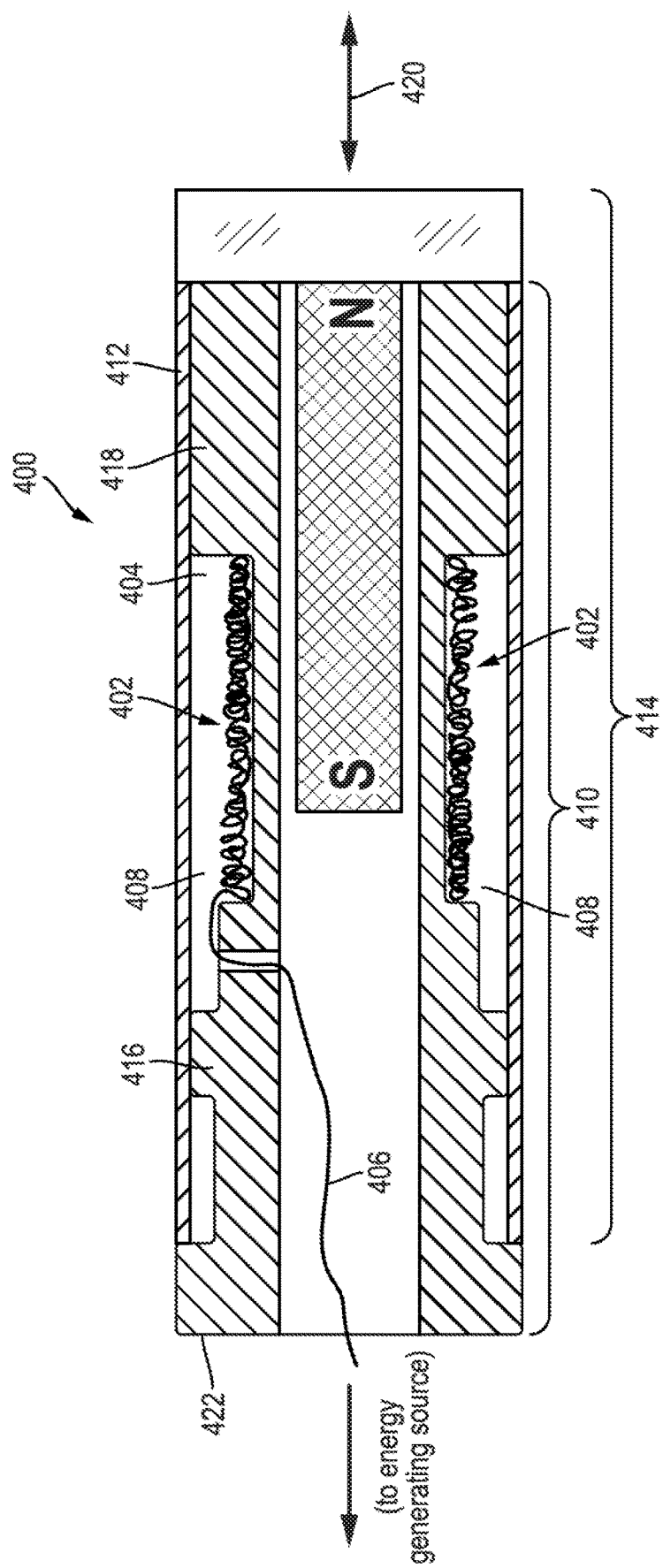

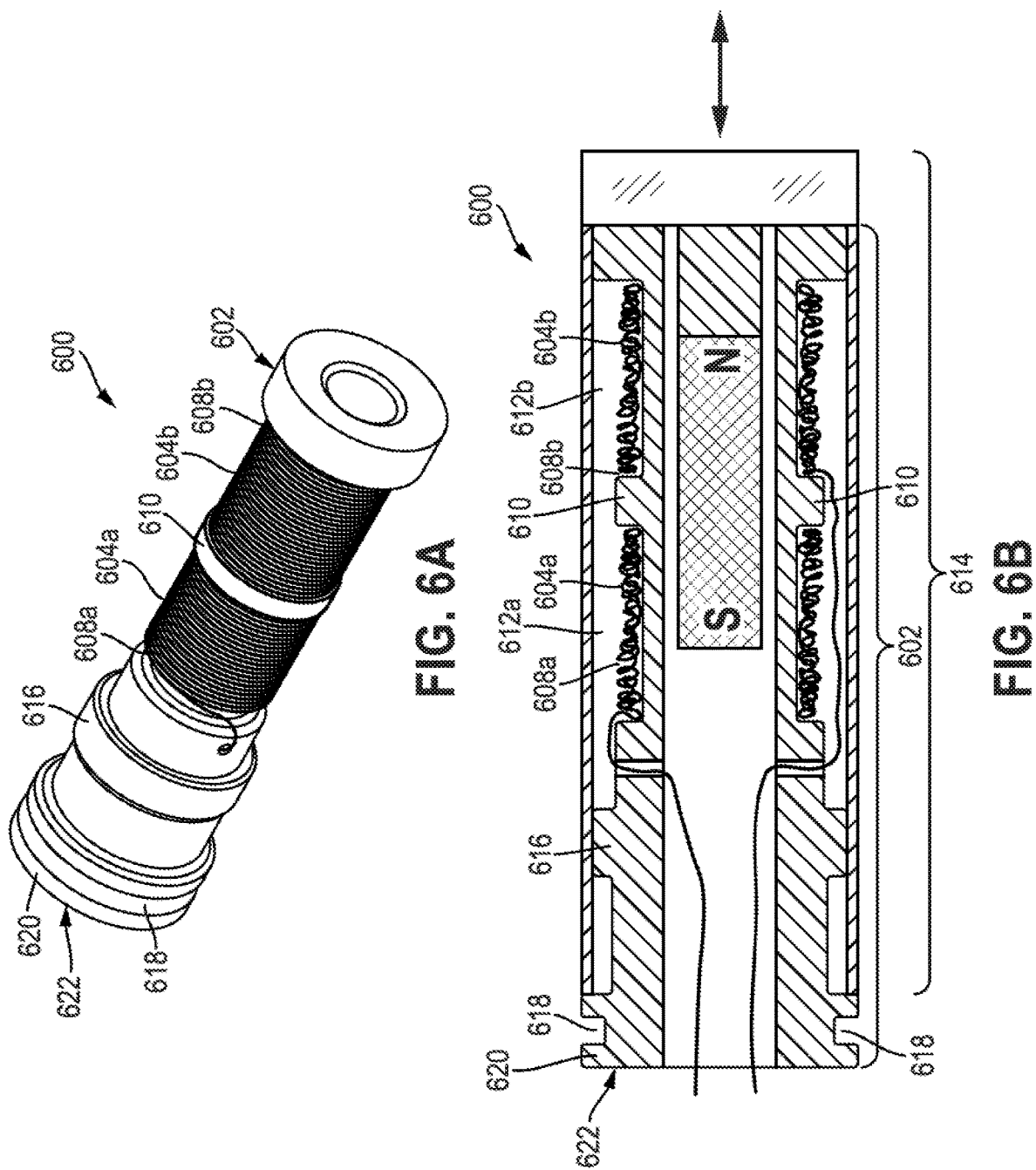

MIRROR BEARING FOR AN INTERFEROMETER

CROSS-REFERENCE TO RELATED APPLICATION

This application claims the benefit of U.S. provisional patent application No. 62/532,446, filed Jul. 14, 2017. The content of this application is incorporated by reference in its entirety.

TECHNICAL FIELD

The disclosure generally relates to the technical field of optical scientific instrumentation. More specifically, the disclosure relates to mirror bearings and mirror alignment systems for Michelson interferometers.

BACKGROUND

An optical interferometer used in a scientific analytical instrument relies on the interference of superimposed optical beams as part of the interrogation means. When configured as a Michelson Fourier-Transformed infrared (FTIR) instrument, the optical output of the interferometer is called an interferogram. The FTIR interferometer itself often includes a beam splitter and two mirrors, one that is conventionally stationary, and one which is conventionally mobile. The mobile mirror moves along the optic axis while staying optically perpendicular to the light beam at all times. The movement of the mobile mirror is often desired to be feedback-controlled in order to hold the mirror velocity constant so that the analytical radiation that passes through the interferometer produces an accurate interferogram. Moreover, the mobile mirror is also often part of an assembly that includes either air bearings or mechanical pivot-type bearings which require costly close tolerance machining and assembly for controlling the tilt of the movable mirror as it moves. Air bearings offer higher performance but are expensive and require an air compressor and filter to supply compressed air. Mechanical pivot-type bearings can have errors in the mirror alignment as the mirror moves. Such alignment problems worsen at long stroke lengths, thus limiting the stroke length and system resolution. Moreover, these types of bearings are subject to wear and degradation. In addition, mechanical bearings also have poor damping and tend to capture or generate mechanical and acoustical vibrations, thereby causing noise in the system output data.

To somewhat address the aforementioned conventional problems, a mirror assembly was manufactured that utilized graphite/glass combinations as part of the construction. Such an assembly is described and claimed in, U.S. Pat. No. 5,896,197, entitled, "INTERFEROMETER HAVING A GLASS GRAPHITE BEARING" issued Apr. 20, 1999, to John M. Coffin, the disclosure of which is incorporated by reference in its entirety, including the following: "[a] bearing for allowing the movement of a movable mirror in a Michelson interferometer includes a stationary hollow glass cylinder and a movable assembly which includes the movable mirror and at least one graphite member, the graphite member being slidably disposed within the bore of the glass cylinder." Part of the basis for such an assembly was to beneficially improve vibration damping because of predictable friction between the different parts and also reduce costs because it enabled low power control systems due to the lightweight nature of the configuration. However, such assemblies have inherent problems in manufacturing and reliability. For example, current manufacturing processes for such glass/graphite configurations calls for hand fitting of the glass tube to the piston, which often leads to large variances between batches of parts. Another problem encountered with such assemblies is that surface imperfections in the glass tube often result in tilt and drive jitter during operation of the final assembly in the interferometer. Finally, buildup of friction of the graphite piston, as evidenced by graphite dust in the glass tube, resulted in the need for higher drive voltages to be applied and such buildup eventually causes system downtime based on the need to clean the glass tube and graphite piston periodically.

To somewhat address the aforementioned conventional problems associated with the combination glass/graphite mirror assembly, an all-graphite mirror assembly was manufactured. Such an assembly is described and claimed in U.S. Pat. No. 9,068,599, entitled, "ALL GRAPHITE INTERFEROMETER BEARING ASSEMBLY" issued Jun. 30, 2015, to John R. Iverson, the disclosure of which is incorporated by reference in its entirety including the following: "[a]n all-graphite bearing for an interferometer, comprising: a base configured with a bore; a hollow graphite tube fixedly disposed within said bore; and a monolithic graphite member disposed within said hollow graphite tube and manufactured from the same grade graphite material as said hollow graphite tube, said monolithic graphite member having an end coupled to a reflective surface, wherein said monolithic graphite member is additionally configured for slidable movement parallel to the central axis of said hollow graphite tube." Part of the basis for the all-graphite mirror assembly was to improve manufacturing parts of the assembly with tolerances and surface finishes that reduces friction and stiction of coupled parts, enabling tighter tolerances so as to improve system performance such as reduced, jitter and further reduction of the weight of the overall assembly which provides for low power control systems to be utilized for actuating the movable mirror while also enabling higher scanning speeds. However, in such assemblies the wire of the movement (or voice) coil is wound around the coil support tube of the mobile mirror assembly resulting in undesirable wire flex of the lead wires of the movement coil during movement of the mobile mirror assembly along its stroke length. In addition, such assemblies have multiple parts resulting in an increased size of the assembly and increased manufacturing costs.

Accordingly, the present disclosure addresses the need for an improved mirror bearing as utilized in scientific optical interferometers such as an FTIR interferometer.

SUMMARY

Aspects of the disclosure are associated with an improved mirror bearing as part of the mobile mirror portion of a Michelson interferometer. The improved mirror bearing includes a stationary mounting member and a mobile mirror assembly. The mounting member is configured to be rigidly coupled to the body of an interferometer such that the mounting member remains stationary during movement of the mirror. The mobile mirror assembly includes a hollow tube that is configured to be slidably disposed around the stationary mounting member. The mobile mirror assembly thus slidably moves relative to the stationary mounting member during operation of the interferometer.

The mobile mirror assembly includes a mirror coupled to the tube and a drive magnet disposed within the hollow tube and coupled to the mirror. The mounting member includes a bore formed longitudinally through its body along a central axis and an area for coupling a drive coil to the mounting member. When the mobile mirror assembly is slidably disposed around the mounting member, the mounting member is received within the hollow tube of the mobile mirror assembly, and the drive magnet is received within the bore of the mounting member. The drive magnet extends through the bore to the location of the area for coupling the drive coil. When current passes through a drive coil coupled to the mounting member, the resulting electromagnetic forces direct the movement of the mobile mirror assembly.

The improved mirror bearing has relatively fewer parts thus reducing both the size and the manufacturing costs of the mirror bearing while maintaining a long stroke length, excellent vibration damping, and reduced sensitivity to external vibrations. In addition, because the drive coil is coupled to the stationary mounting member rather than the mobile mirror assembly, wire flex is advantageously avoided during movement of the mobile mirror assembly. Further objects, features, and advantages of the disclosures will become apparent form the following description taken in conjunction with the accompanying drawings.

BRIEF DESCRIPTION OF THE DRAWINGS

FIG. 1A is a perspective view of an example embodiment of a mirror bearing in a disassembled configuration in accordance with aspects of the disclosure.

FIG. 2A is a side cross-sectional view of an example embodiment of a mirror bearing in a disassembled configuration in accordance with aspects of the disclosure.

FIG. 2B is an assembled side cross-sectional view of the example mirror bearing of FIG. 2A in an assembled configuration in accordance with aspects of the disclosure.

FIG. 4 is a side cross-sectional view of an example embodiment of a mirror bearing in an assembled configuration with a drive coil coupled to the mounting member of the mirror bearing in accordance with aspects of the disclosure.

FIG. 6A is a perspective view of an alternative example embodiment of a mounting member of a mirror bearing in accordance with aspects described herein.

FIG. 6B is a side cross-sectional view of the example mounting member of FIG. 6B in an assembled configuration in accordance with aspects of the disclosure.

Figure 1B:
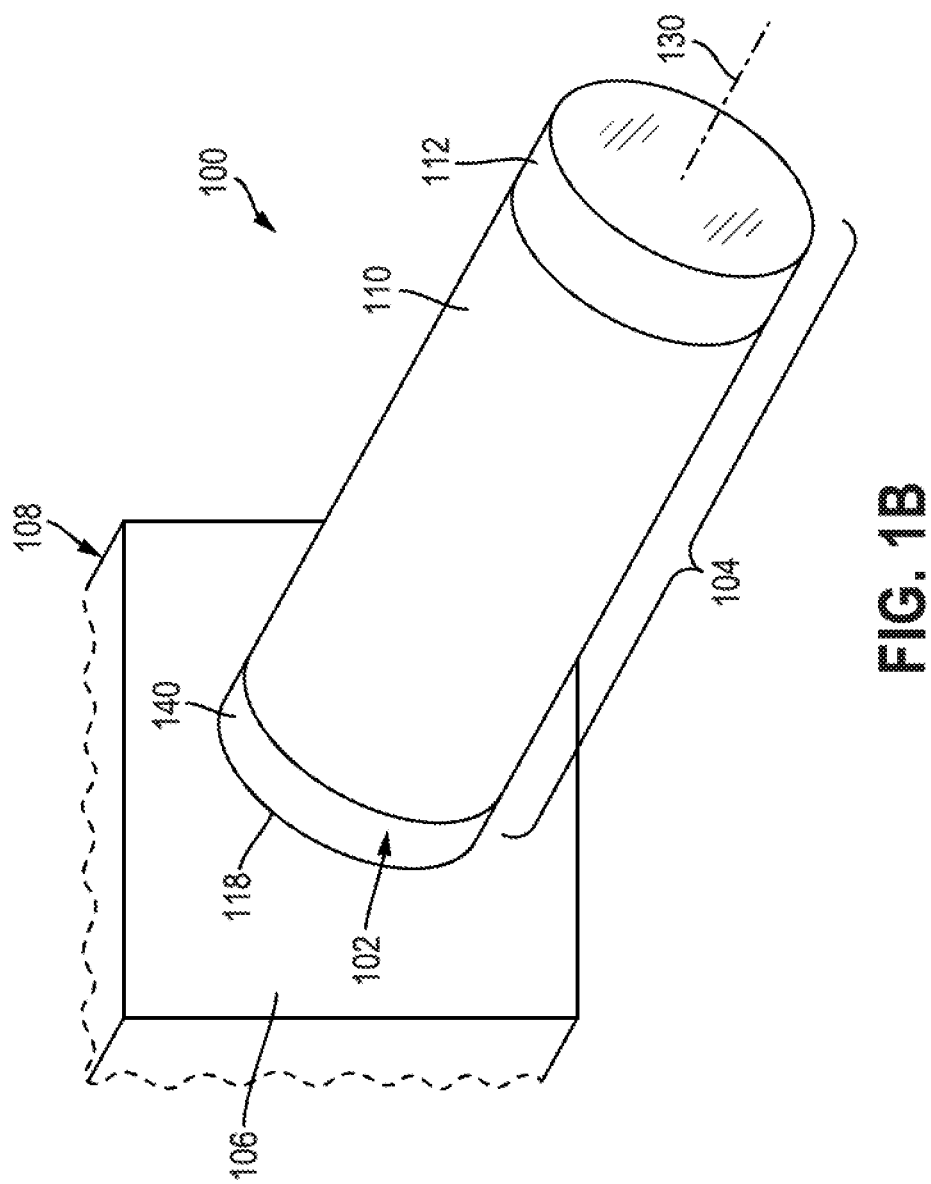
FIG. 1B is a perspective view of the example mirror bearing of FIG. 1A in an assembled configuration in accordance with aspects of the disclosure.

The figures should be understood to present illustrations of the disclosure and/or the principles involved. As would be apparent to one of skill in the art having knowledge of the present disclosure, other devices, methods, and particularly equipment used in scientific optical interferometers such as an FTIR interferometer, will have configurations and components determined, in part, by their specific use. Like reference numerals refer to corresponding parts throughout the several views of the drawings.

DETAILED DESCRIPTION

In the description of the disclosures herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for the purpose of clarity. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing dimensions such as length, width, depth, thickness, angle, duration, and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Interferometers and their operation are well-known to those skilled in the art and thus will not be discussed at length in this description. In general, however, a Michelson interferometer is one type of interferometer and includes a rigid base on which is mounted a beam splitter, a fixed mirror, a first conduit for incoming light and a second conduit for outgoing light. The beam splitter, fixed mirror, and conduits are constructed and positioned according to conventional Michelson interferometer designs.

As a general principle of operation, an input beam of infrared radiation from a source is directed through the first conduit and is received by the beam splitter. The fixed mirror thereafter receives and returns a first beam over a fixed length optical path from the beam splitter. An adjustable plane mirror as part of a moveable assembly, to be discussed below, receives and returns a second beam over a variable length optical path from the beam splitter. The optical path length of the second beam between the beam splitter and the adjustable plane mirror is generated by one or more control instruments to provide for optical path differences between the first and second beams. The beams are combined at the beam splitter and directed through the second conduit to enable a resultant interferogram to be measured. However, while the discussion is directed to Michelson configurations, it is to be understood that the mirror bearing configurations disclosed herein, can also be utilized in other optical/mechanical instruments, as known to those skilled in the art, wherein it is desired to capitalize on the beneficial aspects provided by the combinations.

Turning now to FIGS. 1A and 1B, these figures depict an example embodiment of a mirror bearing 100 in accordance with aspects of the disclosure. In FIGS. 1A and 1B, the mirror bearing 100 is depicted from a perspective view in a disassembled configuration and a assembled configuration, respectively. The mirror bearing 100 in this example includes a stationary mounting member 102 and a mobile mirror assembly 104. The mounting member 102 is configured to be rigidly coupled to the body 106 of an interferometer 108 such that it does not move during operation of the interferometer. The mobile mirror assembly 104 is configured to slide onto the mounting member 102 and slidably move relative to the mounting member during operation of the interferometer 108. In this regard, the mounting member 102 of the mirror bearing 100 is disposed within the mobile mirror assembly 104 in its assembled configuration. The configuration and construction of the mirror bearing 100 should be such that the mobile mirror assembly 104 slidably moves relative to the mounting member 102 with as little friction and/or stiction as possible. The construction and configuration of the components of the mirror bearing 100 will be discussed in further detail below.

The mobile mirror assembly 104 in this example includes a tube 110, a mirror 112, and a drive magnet 114. The tube 110 is configured to receive the end 116 of the mounting member 102 that is disposed opposite to the end 118 of the mounting member that is coupled to the interferometer body 106. In other words, the tube 110 has a configuration that allows it to be slid onto the mounting member 102 and that allows it to slidably move relative to the mounting member which remains stationary during operation.

The tube 110 in this example includes a side wall having an outer surface 120 and an inner surface 122 and includes a rim 124 at each end of the tube in which the rim extends between the outer and inner surfaces of the tube. The width of the rim 124 is defined by the thickness of the tube 110. The tube 110 in this example is cylindrical in shape thus having a circular cross-section. Alternative shapes are possible, e.g., a tube having a cuboid shape with a square or rectangular cross-section. The tube 110 in this example is a hollow tube that includes openings 126 at both ends of the tube. In alternative embodiments, a tube of a mobile mirror assembly may only have one opening at the end of the tube that receives the stationary mounting member 102.

The mirror 112 in this example is a flat, circular mirror. In this example, the surface of the mirror 112 is substantially perpendicular to the longitudinal axis of the mirror bearing 100. In this way, the angle of reflection of the mirror 112 is substantially parallel with the longitudinal axis of the mirror bearing 100. It will be appreciated that achieving a precise perpendicular orientation of the surface of the mirror 112 with respect to the longitudinal axis of the mirror bearing 100 may be difficult and that the mirror may exhibit a slight tilt within acceptable tolerances that still allow the mirror bearing to function properly, e.g., when installed in an interferometer. In an assembled configuration, the mirror 112 is coupled to the end of the tube that is disposed opposite to the end of the tube that receives the stationary mounting member 102. The mirror 112 may have a diameter that is about the same or larger than the outer diameter of the tube 110. Accordingly, the mirror 112 may be coupled to the tube 110 such that its rear surface 128 is flush with the rim 124 of the tube when the mobile mirror assembly 104. In some alternative embodiments, a mirror of a mobile mirror assembly may have a diameter that is slightly less than the inner diameter of the tube such that the mirror may be coupled to the tube by positioning the mirror within the tube and coupling the rim of the mirror to the inner surface of the tube. Alternative shapes for the mirror may also be employed. In addition, an angled mirror may be employed in some example embodiments in which the angle of reflection of the mirror is oblique with respect to the longitudinal axis of the mirror bearing. Various means for coupling the mirror to the tube may be selectively employed including, for example, epoxy or a similar adhesive, screws, nuts and bolts, or the like.

The drive magnet 114 in this example is a cylindrical drive magnet and is coupled to the rear surface 128 of the mirror 112. In an assembled configuration, the drive magnet 114 is disposed within the tube 110 and extends along the central longitudinal axis 130 of the tube. The tube 110, mirror 112, and drive magnet 114 in this example are concentric with one another such that they all share the same central longitudinal axis 130. In some alternative embodiments, a drive magnet may not be coupled to the mirror but rather to a structure within the tube itself, e.g., an interior wall extending between the inner surfaces of the tube and perpendicular to its central longitudinal axis. Various means for coupling the drive magnet to the mirror (or tube) may be selectively employed including those listed above for coupling the mirror to the tube as well as by inserting the drive magnet into a receptacle formed on the rear surface of the mirror (or interior tube structure). Alternative shapes for the drive magnet may also be employed.

The mounting member 102 in this example includes a cylindrical body portion and a central bore 132 formed through the cylindrical body portion. The mounting member 102 also includes one end 118 configured to be coupled to the body 106 of the interferometer 108 and another end 116 configured to be received within the tube of the mobile mirror assembly. For convenience, the end 118 of the mounting member 102 that is coupled to the body 106 of the interferometer 108 is referred to herein as the mounting end of the mounting member, and the end 116 of the mounting member disposed opposite to the mounting end 118 that is received within the tube 110 of the mobile mirror assembly 104 is referred to herein as the free end of the mounting member. In an assembled configuration, the mounting member 102 is likewise concentric with the mobile mirror assembly 104 with each sharing the same central longitudinal axis 130.

The mounting member 102 also includes an area 134 located between the mounting end 118 and the free end 116 of the mounting member for coupling a drive coil to the mounting member. In this regard, this area 134 of the mounting member 102 is referred to as a drive coil receiving area. In an assembled configuration, the drive coil receiving area 134 is also disposed within the tube 110 of the mobile mirror assembly 104. As seen in FIG. 1A and discussed further below, the diameter of the mounting member 102 at the drive coil receiving area 134 is relatively smaller than the diameter of the mounting member at its mounting end 118 and free end 116. The relatively smaller diameter at the drive coil receiving area 134 thus provides a space between the outer surface 136 of the mounting member 102 and the inner surface 122 of the tube 110 when the mobile mirror assembly 104 is slid onto the mounting member. The space for the drive coil is more easily seen in FIG. 2B and FIG. 4 which depict a side cross-sectional view of the example mirror bearing 100 in an assembled configuration. As discussed further below, the drive coil may be a coil of conductive wire that is wound around the drive coil receiving area 134 of the mounting member 102 in some example embodiments. Accordingly, the mounting member 102 in this example includes a hole 138 formed in the side wall of the mounting member 102 and positioned near the drive coil receiving area 134. The hole 138 provides a passageway from the exterior of the mounting member 102 to its central bore 132 for the wire leads of the drive coil. For convenience, this hole 138 is referred to herein as a wire lead hole. The wire leads of the drive coil may pass through the wire lead hole 138, into the bore 132 of the mounting member 102, and out of the mounting end 118 of the mounting member for coupling to an energy generating source (not shown). The drive coil and wire leads are discussed in further detail below with reference to FIGS. 3A-B and FIG. 4. In some example embodiments, the wire lead hole 138 providing the passageway for the wire leads of the drive coil is also disposed within the tube 110 of the mobile mirror assembly 104 in an assembled configuration.

The mounting member 102 in this example additionally includes a mounting flange 140 located at the mounting end 118 to facilitate coupling the mounting member 102 to the body 106 of the interferometer 108. Various means for coupling the mounting member 102 to the body 106 of the interferometer 108 may be selectively employed including those listed above for coupling the mirror 112 to the tube 110. In addition, the mounting member 102 may be coupled to the body 106 of the interferometer 108 by inserting the mounting flange 140 into a receptacle (not shown) formed in the body 106 of the interferometer 108. The mounting member 102 may be coupled directly to the body 106 of the interferometer 108 (e.g., the frame or housing of the interferometer) or the mounting member may be coupled to, e.g., a mounting bracket that is in turn coupled directly or indirectly to the body of the interferometer. Some example embodiments of a mounting member may omit the mounting flange 140 in favor of other means for coupling the mounting member to the body 106 of the interferometer 108, e.g., threads formed on the outer surface of the mounting member at the mounting end that engage corresponding threads formed in the body of the interferometer, in a mounting bracket, or the like. In other example embodiments of a mounting member that omit the mounting flange, the mounting end of the mounting member may be coupled to the body 106 of the interferometer 108 using, e.g., an epoxy or other suitable adhesive.

The mounting member 102 in this example further includes a flange 142 located between the drive coil receiving area 134 and the mounting flange 140. This flange 142 may function to stabilize the mobile mirror assembly 104 on the mounting member 102 in an assembled configuration. For convenience, this flange 142 is referred to herein as a stabilizing flange. In the particular mounting member 102 shown by way of example in FIG. 1A, the stabilizing flange 142 is located on the mounting member between the mounting flange 140 and the wire lead hole 138. As seen in FIG. 1A, the stabilizing flange 142 in this example is positioned adjacent to the wire lead hole 138 and closer to the wire lead hole than the mounting flange 140. As also seen in FIG. 2B, the portion of the mounting member 102 from the mounting flange 140 up to and including the free end 116 of the mounting member is disposed within the tube 110 of the mobile mirror assembly 104 in an assembled configuration.

In FIG. 1B, the mirror bearing 100 is depicted in its assembled configuration and coupled to the body 106 of an interferometer 108. As seen in FIG. 1B, the mounting member 102 is disposed within the tube 110 of the mobile mirror assembly 104. During operating, the mobile mirror assembly 104 slidably moves relative to the mounting member 102 along the central longitudinal axis 130. For example, the mobile mirror assembly 104 may move forward along the central longitudinal axis 130 in a direction away from the mounting end 118 of the mounting member 102 and backward along the central longitudinal axis in a direction toward the mounting end of the mounting member. The maximum distance the mobile mirror assembly 104 moves relative to the mounting member 102 in a forward or backward direction is referred to herein as the stroke length of the mirror bearing 100.

Turning now to FIG. 2A-B, side cross-sectional views of the mirror bearing 100 of FIGS. 1A-B are shown in a disassembled and assembled configuration, respectively. As seen in FIG. 2A-B, the components of the mirror bearing 100 are sized and shaped so as to permit the mobile mirror assembly 104 to slide onto the mounting member 102.

In this regard, the mounting member 102 and the tube 110 of the mobile mirror assembly 104 are sized and shaped so as to permit the tube to receive the free end 116 of the mounting member. Accordingly, the inner diameter, $d_1$, of the tube 110 may be slightly larger than the outer diameter, $d_2$, of the mounting member 102 at its free end 116. The outer diameter, $d_3$, of the tube 110 may thus be defined by its inner diameter, $d_1$, and the thickness, t, of its side wall (e.g., $d_3=d_1+t$). In some example implementations, the clearance between the mounting member 102 and the tube 110 may be between about 0.0007 inches (in.) and about 0.002 in., and may be about 0.001 in. in some particular implementations. The construction of the mobile mirror assembly 104 and the mounting member 102 should be such that the space between the outer surface 136 of the mounting member at its free end 116 and its stabilizing flange 142 and the inner surface 122 of the tube 110 is minimized but sufficient to provide smooth, slidable movement of the mobile mirror assembly relative to the mounting member without friction or stiction. As noted above, the mirror 112 of the mobile mirror assembly 104 may have a diameter, $d_4$, that is about the same as the outer diameter, d1, of the tube 110 of the mobile mirror assembly 104 in some example embodiments. In some example embodiments the mirror may be smaller or larger than the tube, the mirror may be mounted off-center, and/or the mirror may be any shape (e.g. rectangular, triangular) as needed by other parts of the system.

In addition, the drive magnet 114 of the mobile mirror assembly 104 is disposed within both the tube 110 of the mobile mirror assembly 104 and the bore 132 of the mounting member 102 in an assembled configuration as seen in FIG. 2B. Accordingly, the bore 132 of the mounting member 102 is sized and shaped so as to receive the drive magnet 114 when the mobile mirror assembly 104 is slid onto the mounting member 102. In this regard, the bore 132 of the mounting member 102 has a diameter, $d_5$, that is larger than the diameter, $d_6$, of the drive magnet 114. The drive magnet 114 in this example is depicted with its north pole positioned adjacent to the rear surface 128 of the mirror 112 and its south pole positioned opposite the mirror. The drive magnet 114 may alternatively be oriented in the opposite orientation, i.e., with its south pole positioned adjacent to the rear surface 128 of the mirror 112.

As shown in FIG. 2A, the mounting member 102 in this example has different diameters at different regions of the mounting member. For instance, the mounting member 102 in this example has a diameter, $d_7$, at the drive coil receiving area 134 that is smaller than the diameter, $d_2$, at its free end 116 and its mounting end 118 and that is smaller than the diameter, $d_8$, of the mounting member in the region containing the wire lead hole 138. In this way, and as seen in FIG. 2B, the mirror bearing 100 defines a space 144 between the outer surface 136 of the mounting member 102 at the drive coil receiving area 134 and the inner surface 122 of the tube 110 of the mobile mirror assembly 104 in an assembled configuration. In this way, a drive coil may be coupled to the drive coil receiving area 134 while maintaining smooth, slidable movement of the mobile mirror assembly 104 relative to the mounting member 102. The mounting member 102 in this example also has a diameter, $d_9$, at the stabilizing flange 142 that is about the same as the outer diameter, $d_2$, of the mounting member at its free end 116. In this way, the stabilizing flange 142 functions to stabilize the mobile mirror assembly 104 on the mounting member 102 in an assembled configuration. The diameter, $d_8$, of the region of the mounting member 102 that includes the wire lead hole 138 may be less than the diameters, $d_2$ and $d_9$, of the free end 116 and stabilizing flange 142 respectively. In this way, and as also seen in FIG. 2B, the mirror bearing 100 defines a space 146 between the outer surface 136 of the mounting member 102 at the region that includes the wire lead hole 138 and the inner surface 122 of the tube 110 of the mobile mirror assembly 104 in an assembled configuration. In this way, the wire leads of the drive coil may be fed through the wire lead hole 138 again while maintaining smooth, slidable movement of the mobile mirror assembly relative to the mounting member. The mounting member 102 in this example also has a diameter, $d_{10}$, at the mounting flange 140. In some example embodiments, the diameter, $d_{10}$, at the mounting flange 140 may be the largest diameter of the mounting member 102.

FIG. 2B depicts the mirror bearing 100 in its assembled configuration. As seen in FIG. 2B, the mobile mirror assembly 104 has been slid onto the free end 116 of the mounting member 102. The tube 110 of the mobile mirror assembly 104 has received the free end 116 of the mounting member 102 such that the mounting member is disposed within the tube from the outer edge of the free end 116 up to the start of the mounting flange 140 of the mounting member. As seen in FIG. 2B, the mounting member 102 supports the tube 110 of the mobile mirror assembly 104 at the free end 116 and the stabilizing flange 142 of the mounting member. The tube 110 in this example has a length, $l_1$, such that the drive coil receiving area 134 of the mounting member 102, the region of the mounting member containing the wire lead hole 138, and the stabilizing flange 142 are all disposed within the tube. In this regard, the mounting member 104 has an overall length, $l_2$, that is longer than the length, $l_1$, of the tube 110 of the mobile mirror assembly 104 in this example embodiment.

In addition, the mounting member 102 may be described with respect to the lengths of its various regions between the outer edge of its free end 116 and the outer edge of its mounting end 118. Starting from the outer edge of the free end 116 of the mounting member 102 and moving toward its mounting end 118, the mounting member in this example has a length, $l_3$, between the outer edge of the free end and the start of the drive coil receiving area 134; a length, $l_4$, along the drive coil receiving area; a length, $l_5$, across the region of the mounting member that extends from the end of the drive coil receiving area to the start of the stabilizing flange 142 and that includes the wire lead hole 138; a length, $l_6$, across the stabilizing flange; a length, $l_7$, across the region of the mounting member that extends from the end of the stabilizing flange to the start of the mounting flange 140; and a length, $l_8$, across the mounting flange. In this regard, the overall length, $l_2$, of the mounting member 102 may be the sum of the lengths, $l_{3-8}$, of its various regions.

As also seen in FIG. 2B, the central bore 132 of the mounting member 102 has received the drive magnet 114 of the mobile mirror assembly 104 such that the drive magnet is disposed within the central bore. The drive magnet 114 in this example has a length, $l_9$, such that one of its poles (e.g., the south pole in this example) is positioned within the region of mounting member 102 corresponding to the drive coil receiving area 134. In this regard, the length, $l_9$, of the drive magnet 114 may be less than 100% of the length, $l_1$, of the tube 110 of the mobile mirror assembly 104 in some example embodiments. In general, the length, $l_9$, of the drive magnet 114 should be sufficient to position the drive magnet sufficiently close to the drive coil so as to allow the drive coil to drive the mobile mirror assembly 104 in the desired direction and at the desired distance. Similarly, the length, $l_4$, of the drive coil receiving area 134 should be sufficiently long to couple a drive coil to the mounting member 102 that provides the desired stroke length for the mobile mirror assembly 104. For example, if the desired stroke length is about 0.4 in., then the drive coil should have a length of about 0.6 in. and the length, $l_4$, of the drive coil receiving area 134 should be sufficient to accommodate the coupling of this example drive coil to the mounting member 102. Smaller dimensions may be employed where the desired stroke length is shorter, e.g., a stroke length between 1 and 10 millimeters (mm.). As seen in FIG. 2B, the length, $l_9$, of the drive magnet 114 in this example is sufficient to position it in the central bore 132 of the mounting member 102 within the region of the mounting member defined by the drive coil receiving area 134.

The drive magnet should have a length sufficient for controllable and repeatable movement of the mobile mirror assembly 104 of the mirror bearing 100 via the drive coil. In this regard, the length of the drive magnet may be about two times longer than the desired stroke length in some example implementations so as to limit the effect of the magnetic field from the opposite end of the drive magnet positioned proximate to the mirror (e.g., the north pole end of the drive magnet 114 in FIG. 2B). More generally, the length of the drive magnet should be sufficient to prevent the opposite end of the drive magnet from interfering with (e.g., reducing or canceling) the magnetic field generated by the drive coil and used to drive the mobile mirror assembly 104. For example, as seen in FIG. 2B, the north pole of the drive magnet 114 is located relatively far from the drive coil receiving area 134 even with the mobile mirror assembly 104 at its minimum distance along the mounting member 102. In addition, the end of the drive magnet 114 (e.g., the south pole end) that is driven by the drive coil should remain disposed within the region of the mounting member defined by the drive coil receiving area 134—and thus remain disposed within the magnetic field generated by the drive coil—at the maximum distance of the mobile mirror assembly 104 along the mounting member 104. In some example implementations, the length of the drive magnet may be such that the magnetic field generated by the drive coil extends past the drive magnet about ten percent of the length of the drive magnet. In this way, the electromagnetic forces that act on the drive magnet 114 to drive the mobile mirror assembly 104 may be fairly constant over the stroke length.

It will be appreciated that different embodiments of the mirror bearing described herein may have different dimensions. One example embodiment of a mirror bearing may have the following dimensions. The length, $l_1$, of the tube of the mobile mirror assembly may be about 1.375 in., and in some example implementations may be up to and exceeding 2.75 in. The inner diameter, $d_1$, of the tube of the mobile mirror assembly may be between about 0.4210 in. and about 0.4213 in. The outer diameter, $d_3$, of the tube of the mobile mirror assembly may be about 0.545 in.±0.10 in. The overall length, $l_2$, of the mounting member may be about 1.5 in., and in some example implementations may be up to and exceeding 3.0 in. The length, $l_3$, between the outer edge of the free end and the start of the drive coil receiving area of the mounting member may be about 0.4 in. The length, $l_4$, along the drive coil receiving area of the mounting member may be about 0.5 in. The length, $l_5$, along the region extending between the end of the drive coil receiving area and the start of the stabilizing flange and including the wire lead hole of the mounting member may be about 0.151 in. The length, $l_6$, across the stabilizing flange of the mounting member may be about 0.121 in. The length, $l_7$, along the region extending between the end of the stabilizing flange and the start of the mounting flange of the mounting member may be about 0.203 in. The length, $l_8$, along the mounting flange of the mounting member may be about 0.125 in. The diameter, $d_5$, of the central bore of the mounting member may be about 0.202 in.±0.005 in. The outer diameter, $d_2$, of the mounting member and the diameter, $d_9$, of the stabilizing flange of the mounting member may be between about 0.4196 in. and 0.420 in., and in some example implementations may be up to and exceeding 2 in. The diameter, $d_7$, of the mounting member at the drive coil receiving area may be about 0.282 in.±0.005 in. The diameter, $d_8$, of the region of the mounting member that includes the wire lead hole may be about 0.380 in.±0.010 in. The diameter, $d_{10}$, of the mounting flange may be about 0.500 in.±0.005 in. The diameter of the wire lead hole itself may be between about 0.030 in.±0.005 in.

In some embodiments, the mounting member and the tube of the mobile mirror assembly may be constructed entirely of graphite, e.g., a non-dusting graphite. Graphite materials provide various advantages when used for a mirror bearing having a mobile mirror assembly such as the mirror bearing described herein. Such advantages include an electrical resistance that mitigates eddy current losses, good thermal conductivity that cools the drive coil, self-lubrication resulting in good wear characteristics, keeping the mirror bearing clean and dry, and generally prolonging the useful life of the mirror bearing. Graphite material suitable for the construction of the mounting member and the tube includes a non-dusting graphite, e.g., a graphite having particles sizes of about 2 microns up to about 5 microns, a density of about 1.8 g/cm$^3$, a flexure strength of about 57 megapascals (MPa) up to about 86 MPa, and a Coefficient of thermal expansion (CTE) of 5.5 $10^{-6}$/C.° up to about 7.5 $10^{-6}$/C.°. In addition, the mounting member and the tube may each have a monolithic construction manufactured using, e.g., machining techniques (e.g., lathing, milling), molding techniques, and/or additive manufacturing techniques (e.g., 3D printing).

Figure 3A:
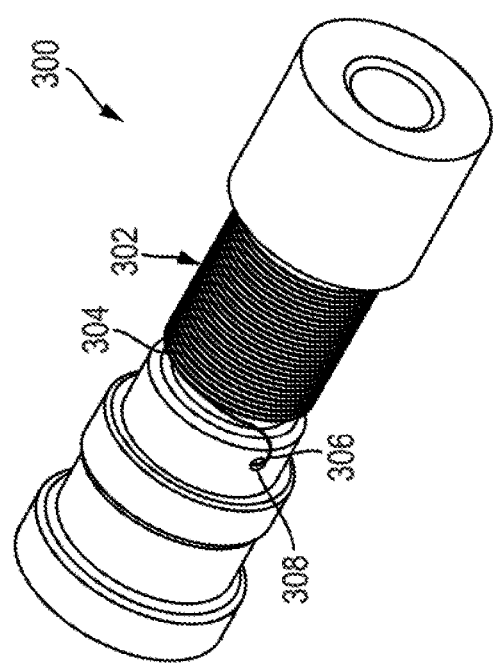
FIG. 3A is a perspective view of an example embodiment of a mounting member of a mirror bearing coupled to a drive coil in accordance with aspects of the disclosure.
Figure 3B:
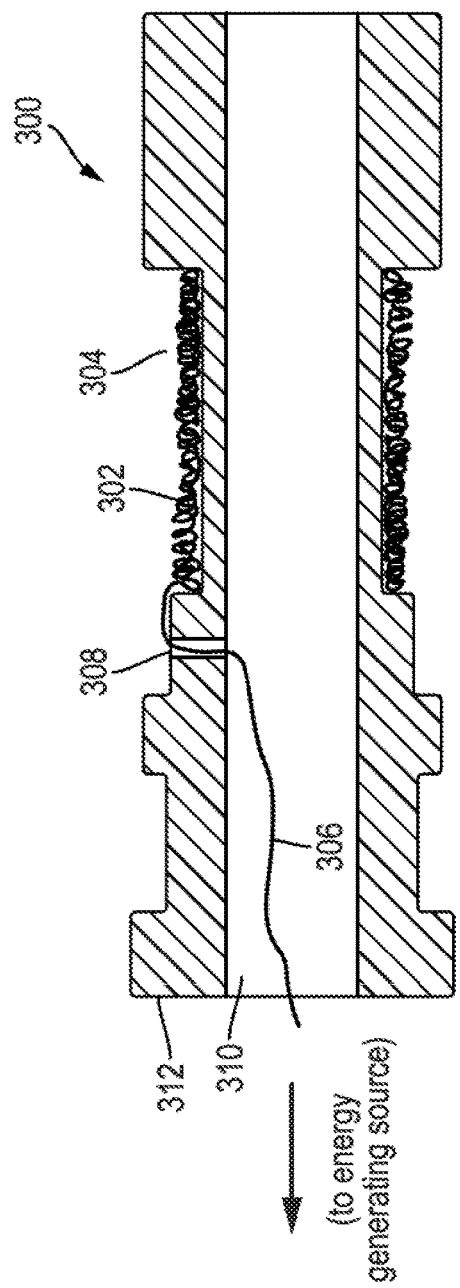
FIG. 3B is a side cross-sectional view of the example mounting member of FIG. 3A in accordance with aspects of the disclosure.

Referring now to FIG. 3A, a perspective view of an example embodiment of a mounting member 300 of a mirror bearing is shown with a drive coil 302 coupled to its drive coil receiving area 304. The mounting member 300 shown by way of example in FIG. 3A is the same type of mounting member discussed above with reference to FIGS. 1A-B and 2A-B. The drive coil 302 in this example includes a coil of conductive wire (e.g., a voice coil) and is coupled to the mounting member 300 by wrapping the wire around its drive coil receiving area 304. In this way, the drive coil receiving area 304 holds the drive coil 302 in a fixed position. As seen in FIG. 3A, the length of the drive coil 302 is about the same as the length of the drive coil receiving area 304. Similar to the drive coil receiving area 304 of the mounting member 300, the length of the drive coil 302 may be slightly greater than the desired stroke length. For example, if the desired stroke length is about 2 in., then the drive coil 302 should have a length of about 2.25 to about 2.60 in. The drive coil 302 in this example is wound around the drive coil receiving area 304 of the mounting member 300 and also includes a wire lead 306 that passes through the wire lead hole 308 of the mounting member 300 as shown in FIG. 3A-B. For convenience, only a single wire lead 306 is shown in FIG. 3A-B, but it should be appreciated that the drive coil 302 may include two wire leads that each pass through the wire lead hole 308 into the central bore 310 of the mounting member 300, and out the mounting end 312 of the mounting member for coupling to an energy generating source. Likewise, although the mounting member 300 shown by way of example in FIG. 3 is depicted with only a single wire lead hole, a mounting member in some other example implementations may include two wire lead holes, one for each respective wire lead of the drive coil. The two wire lead holes may be formed in the mounting member along the same circumferential perimeter, e.g., diametrically opposed to one another. By coupling the drive coil 302 to the stationary mounting member 300, the drive coil also remains stationary during operation of the mirror bearing and advantageously avoids flexing of the conductive wire as the mobile mirror assembly moves forward and backward along the mounting member.

Referring now to FIG. 4, an example embodiment of a mirror bearing 400 in an assembled configuration with a drive coil 402 coupled to its drive coil receiving area 404 is shown. The mirror bearing 400 and its components are the same as those discussed above with reference to FIGS. 1A-B, 2A-B, and 3A-B. As seen in FIG. 4, the drive coil 402 and its wire lead 406 are disposed within the space 408 between the outer surface of the mounting member 410 at its drive coil receiving area 404 and the inner surface of the tube 412 of the mobile mirror assembly 414. Because the stabilizing flange 416 and the free end 418 of the mounting member 410 support the tube 412 of the mobile mirror assembly 414, as also seen in FIG. 4, the drive coil 402 does not interfere with the slidable movement of the mobile mirror assembly 414 relative to the mounting member 410 along the longitudinal axis 420 of the mirror bearing 400. Again, although only a single wire lead 406 is shown in FIG. 4, the drive coil 402 may include multiple wire leads that are coupled to an energy generating source as described above.

When the mirror bearing 400 is installed in an interferometer, the wire leads (e.g., wire lead 406) are coupled to an energy generating source (not shown) that energizes the drive coil 402 by passing a current through it. The current passing through the drive coil 402 generates a magnetic flux field which results in an electromagnetic force that drives the mobile mirror assembly 414 slidably along the longitudinal axis 420 of the mirror bearing 400. The mobile mirror assembly 414 thus moves linearly forward and backward with respect to the mounting member 410 during operation. Depending on the direction the current passes through the drive coil 402, the electromagnetic force that results will either propel the mobile mirror assembly 414 forward (i.e., away from the mounting end 422 of the mounting member 410) or attract the mobile mirror assembly backward (i.e., toward the mounting end of the mounting member). In this way, the energy generating source may selectively provide current to the drive coil 402 alternately in one direction and then the other in order to drive the mobile mirror assembly 414 back and forth along the longitudinal axis 420 of the mirror bearing 400. The distance the mobile mirror assembly 414 travels depends on the amount of time that current is provided to the drive coil 402. The current is low when traveling at a constant velocity and spikes higher as the speed changes during the turnaround at the end of each stoke. The energy generating source may thus selectively provide a current (e.g., in a desired direction and in a desired amount) in order to drive the mobile mirror assembly 414 either forward or backward a desired distance along the stationary mounting member 410.

Figure 5:
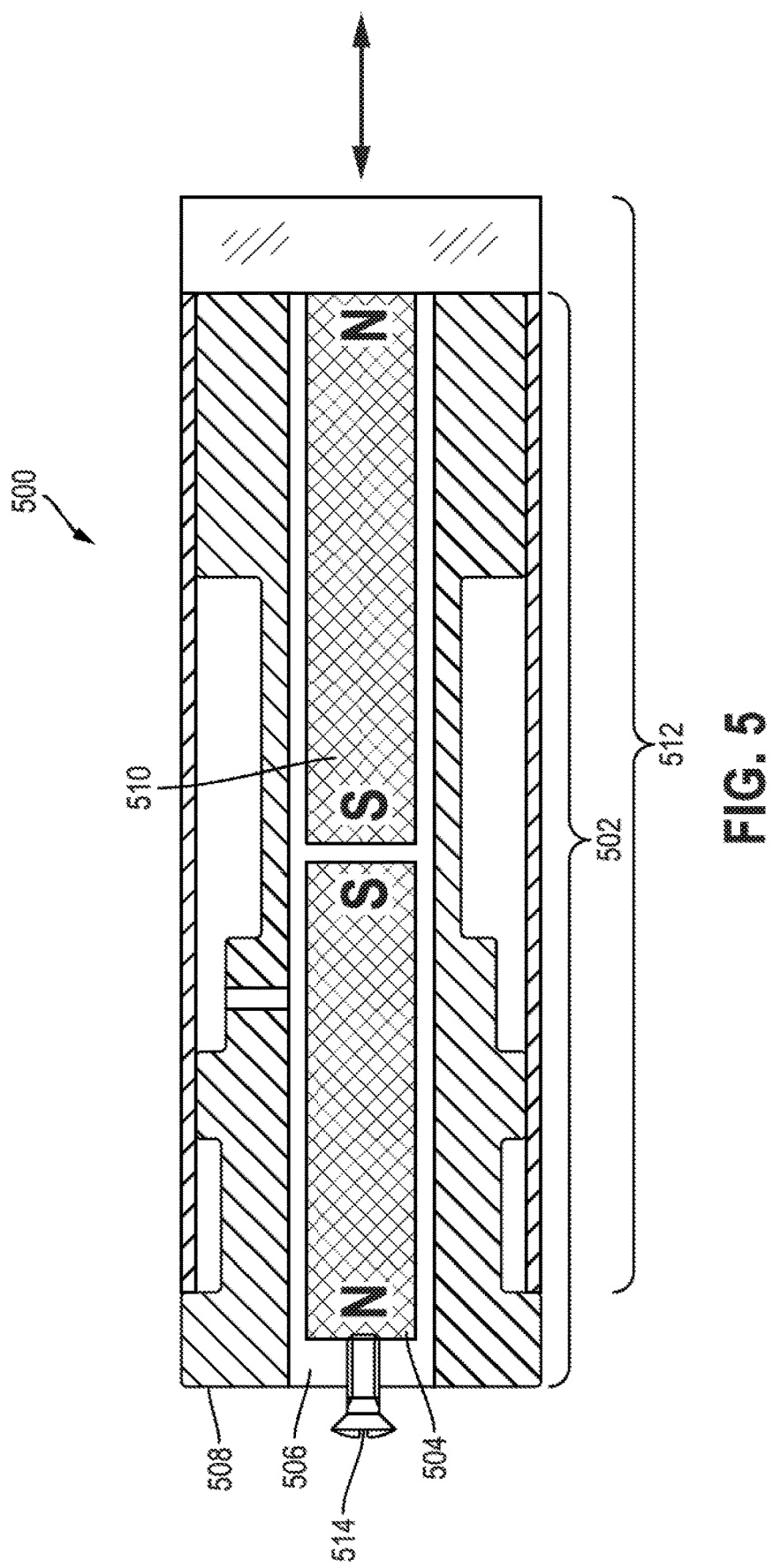
FIG. 5 is a side cross-sectional view of an alternative embodiment of a mirror bearing in accordance with aspects of the disclosure.

Referring now to FIG. 5, a side cross-sectional view of an alternative embodiment of a mirror bearing 500 is shown. The mirror bearing 500 and its components in this alternative example is similar to those discussed above with reference to FIGS. 1A-B, 2A-B, 3A-B, and FIG. 4. For clarity, the drive coil has been omitted from FIG. 5, but it will be appreciated that a drive coil may be coupled to the mounting member 502 of the mirror bearing 500 of FIG. 5 in the same manner as discussed above, e.g., with reference to FIG. 3A-B. The mirror bearing 500 in this alternative example differs from those previously discussed in that it includes a repulsion magnet 504 disposed within the central bore 506 of the mounting member 502 near its mounting end 508. The repulsion magnet 504 is positioned within the central bore 506 such that it provides a repelling force against the drive magnet 510 of the mobile mirror assembly 512 in a direction away from the mounting end 508 of the mounting member 502. As shown by way of example in FIG. 5, the drive magnet 510 and the repulsion magnet 504 are disposed within the central bore 506 of the mounting member 502 with their respective south poles facing each other. The opposite orientation of the drive magnet 510 and the repulsion magnet 504 may also be employed (e.g., with their north poles facing each other).

The repelling force provided by the repulsion magnet 504 acts to smoothly stop the mobile mirror assembly 512 as it moves backwards along the mounting member 502. The repulsion magnet 504 also enables the mirror bearing 500 to operate at any angle between the horizontal (e.g., 0° relative to the ground) and the vertical (e.g., 90° relative to the ground). Using the repulsion magnet 504 enables the starting position of the mobile mirror assembly 512 to be defined in a soft, smooth, repeatable way by providing a stopping location for the mobile mirror assembly in which the repulsion magnet balances the other forces acting on the mobile mirror assembly. For example, the mobile mirror assembly 512 may be subject to a force that drives the mobile mirror assembly backward along the mounting member 502. Such a force may result from a fixed current provided to the drive coil or from gravity when the mirror bearing 500 is positioned vertically or at an oblique angle between the horizontal and the vertical. Where the mirror bearing is oriented horizontally, a relative small repulsion magnet placed close to the drive magnet may be sufficient. Where the mirror bearing is oriented vertically or obliquely with a relatively longer stroke length, a relatively larger repulsion magnet positioned relatively farther away from the drive magnet may be needed in order to support the weight of the mobile mirror assembly so as to avoid the need for high currents through the drive coils that may cause overheating. The starting position of the mobile mirror assembly 512 may thus be the point at which the repelling force provided by the repulsion magnet 504 balances the external forces acting on the mobile mirror assembly 512. The balance point may thus correspond to a known, controllable starting position for the mobile mirror assembly 512. The balance point, and thus the starting position, may be adjusted by adjusting the position of the repulsion magnet 504 relative to the drive magnet 510.

The strength of the repelling force applied to the drive magnet 510 depends on the distance between the repulsion magnet 504 and the drive magnet. When the repulsion magnet 504 is relatively closer to the drive magnet 510, the repelling force applied is relatively stronger. When the repulsion magnet 504 is relatively further from the drive magnet 510, the repelling force is relatively weaker. The mirror bearing 500 in this alternative example thus includes a position adjuster 514 for the repulsion magnet 504 that is used to adjust the position of the repulsion magnet forward or backward in the central bore 506 the mounting member 502 thereby moving the repulsion magnet closer to or further from the drive magnet 510. A position adjuster for the repulsion magnet 504 may be implemented in various ways. As shown by way of example in FIG. 4, the position adjuster 514 includes a screw that moves the repulsion magnet 504 forward or backward depending on which direction the screw turns. The screw may be turned manually by hand, manually via tool (e.g., a screwdriver or a wrench), or via a motor (e.g., a stepper motor). In some alternative embodiments, the position adjuster itself may be implemented as a stepper motor that is coupled directly to the repulsion magnet 504 and operates to selectively move the repulsion magnet forward or backward within the central bore 506 of the mounting member 502. Additional and alternative means for implementing the position adjuster may be selectively employed. The size of the repulsion magnet may depend on the desired stroke length for the mirror bearing. For example, where the desired stroke length is relatively small—e.g., between about 1 millimeter (mm) to about 10 mm—a relatively small magnet may be employed. Where the desired stroke length is larger, a relatively larger magnet may be needed. For example, where relatively longer stroke lengths are desired, a relatively larger space may be needed between the repulsion magnet and drive magnet as well as a relatively larger repulsion magnet to provide the desired amount of force. A relatively larger repulsion magnet may also be needed in implementations where the weight of the mobile mirror assembly is relatively heavier in implementations where the mirror bearing is oriented vertically or obliquely. The repulsion magnet may be particularly useful to provide a relatively low-power operation in implementations where the mobile mirror assembly is oriented vertically since the repulsion magnet is able to bear the weight of the mobile mirror assembly and provide a controllable starting location with the drive coil needing little to no power. In this regard, the repulsion magnet may provide a repelling force sufficient to position the mobile mirror assembly at a predetermined location along the mounting member without providing power to the drive coil. The starting location provided by the repulsion magnet may otherwise be fine-tuned by providing slight power to the drive coil. As noted above, the components of the mirror bearing in FIG. 5 are not necessarily drawn to scale. Accordingly, while the repulsion magnet 504 is depicted in FIG. 5 as relatively long and positioned relatively close to the drive magnet 510, a repulsion magnet may be shorter than the repulsion magnet 504 and positioned farther away from the drive magnet (e.g., spaced apart from the drive magnet by a larger gap) in some example implementations.

In some example embodiments, a stopping member may be employed to limit forward travel of the mobile mirror assembly. In other words, the stopping member may limit or otherwise restrict movement of the mobile mirror assembly in a direction away from the mounting end of the mounting member in order to prevent the mobile mirror assembly from sliding off the mounting member. Various means may be selectively employed to implement the stopping member. For example, a stopping magnet may be used to limit forward travel of the mobile mirror assembly relative to the mounting member. As another example, a rubber stop may be employed such that the mirror of the mobile mirror assembly impacts the rubber stop during forward travel. The rubber stop may be employed, for example, during shipping so as to prevent the mobile mirror assembly from sliding off the mounting member of the mirror bearing.

FIG. 6A-B depict an alternative example embodiment of a mirror bearing 600 and its mounting member 602 in which two drive coils 604a and 604b are employed to drive the drive magnet 606. For convenience, this alternative embodiment of the mirror bearing 600 is referred to herein as a double-coil mirror bearing. As seen in FIG. 6A-B, the mounting member 602 of the double-coil mirror bearing 600 in this example includes two drive coil receiving areas 608a and 608b, each configured to hold in a fixed position one of the drive coils 604a and 604b. As also seen in FIG. 6A-B, the mounting member 602 includes a flange 610 positioned between the drive coil receiving areas 608a and 608b. In addition, the arrangement of the drive coil receiving areas 608a and 608b is such that the respective poles of the drive magnet 606 are disposed within the regions of the mounting member 602 respectively corresponding to one of the drive coil receiving areas. For example, as seen in FIG. 6B, the south pole of the drive magnet 606 is disposed within the region of the mounting member 602 corresponding to the drive coil receiving area 608a, and the north pole of the drive magnet 606 is disposed within the region of the mounting member corresponding to the drive coil receiving area 608b. In this way, the south pole of the drive magnet 606 may be driven by forces resulting from the magnetic flux field generated by the drive coil 604a, and the north pole of the drive magnet 606 may be driven by forces resulting from the magnetic flux field generated by the drive coil 604b. The drive coils 604a and 604b may be wrapped around the mounting member in opposite directions such that the forces acting on each pole of the drive magnet 606 sum together and provide up to double the amount of force available to drive the mobile mirror assembly forwards and backwards. This additional force may be useful where the double-coil mirror bearing is employed in a vertical or oblique orientation as well as when rapid, short strokes are desired. Like the drive coil receiving area discussed above with reference to FIG. 4, each drive coil receiving area 608a and 608b defines respective spaces 612a and 612b between the outer surface of the mounting member 602 and the inner surface of the mobile mirror assembly 614 when the double-coil mirror bearing 600 is in an assembled configuration. The dual-coil mirror bearing 600 may selectively be employed in implementations where a vertical or oblique orientation is needed or desired since controlling the mobile mirror assembly may be achieved by providing relatively more power to the drive coils 604a-b. The additional force provided by the dual drive coils 604a-b may also allow a smaller repulsion magnet to be utilized or omitted altogether. The additional power provided to the dual drive coils 604a-b and resulting additional force may also enable relative higher scanning rates to be achieved with the dual-coil mobile mirror bearing 600. Furthermore, the additional force resulting from the dual drive coils 604a-b allows the mobile bearing to be used in a vertical or oblique orientation with the mirror facing straight down or in a downward direction. In this regard, the force on the mobile mirror assembly from the dual drive coils 604a-b may be sufficient to prevent the mobile mirror assembly from sliding off the mounting member but nevertheless control its movement along the mounting member during operation.

The double-coil mirror bearing may include additional features to accommodate the second drive coil. For example, the double-coil mirror assembly may include one or more additional wire lead holes that provide passage of the wire leads of the second drive coil into the central bore of the mounting member for connection to an energy generating source as described above. The additional wire lead holes may be located between the stabilizing flange (e.g., flange 616 in FIG. 6) and the first drive coil receiving area (e.g., drive coil receiving area 608a in FIG. 6), may be located on the flange between the two drive coil receiving areas (e.g., flange 610 in FIG. 6), or elsewhere on the mounting member that is convenient for providing frictionless and stictionless movement of the mobile mirror assembly (e.g., mobile mirror assembly 614 in FIG. 6). Some example implementations of the double-coil mirror bearing may also include a repulsion magnet such as that discussed above with reference to FIG. 5. In addition, rather than wrapping the drive coils around the mounting member in opposite directions, the same effect may be achieved by wrapping the drive coils around the mounting member in the same direction but with their respective wire leads reversed at the energy generating source.

As also seen in FIG. 6A-B, an annular groove 618 is formed in the mounting flange 620 at the mounting end 622 of the mounting member 602. A clip may be employed to engage the annular groove 618 when coupling the mounting member 602 to the body of an interferometer as described above. Using a clip that engages the annular groove 618 may enable an individual to couple the mounting member 602 to and decouple the mounting member from the body of the interferometer by hand relatively quickly and easily. The mounting members discussed above with reference to FIGS. 1A-B, 2A-B, 3A-B, 4 and 5 may likewise include an annular groove such as that described with reference to FIG. 6A-B.

In some example embodiments, a fixed, thin iron sleeve may be positioned near (e.g., over or around) the mobile mirror assembly so as to shield the mirror bearing from external magnetic fields and so as to increase the internal magnetic field provided by the drive coil thereby increasing the forces that drive the mobile mirror assembly for a given current provided to the drive coil. Using an iron sleeve in this fashion may allow operation of the mirror bearing near strong, external magnetic fields (e.g., near a magnetic resonance imaging (MRI) system) as well as in higher vibration environments (e.g., in a moving vehicle).

In some example embodiments, an anti-rotation system may be employed to limit or otherwise prevent unwanted rotation of the mobile mirror assembly around the central longitudinal axis of the mirror bearing. The anti-rotation system may include, for example, an anti-rotation magnet coupled to the outer surface of the tube of the mobile mirror bearing that is attracted to a stationary magnet positioned proximate to the mirror bearing. Instead of a stationary magnet, a coil of wire may be employed that selectively generates a magnetic flux field that attracts the anti-rotation magnet in order to prevent unwanted rotation. A suitable anti-rotation system that may be employed with the mirror bearing disclosed herein is described in co-owned U.S. Pat. No. 5,896,197 entitled "INTERFEROMETER HAVING GLASS GRAPHITE BEARING" which issued on Apr. 20, 1999, and which is incorporated by reference herein in its entirety.

As noted above, the wire lead of the drive coil is couple to an energy generating source to selectively provide current to the drive coil. The mirror bearing disclosed herein may thus be operated via a computer or processor (not shown), which may be a special-purpose computing device, a computing device specially programmed with appropriate computer-executable instructions stored on a non-transitory computer-readable storage medium, a digital signal processor, an application-specific integrated circuit, and the like, being configured to selectively provide the drive coil with the current in the desired direction and in the desired amount so as to cause the mobile mirror assembly to move in the desired direction and at the desired distance. Suitable non-transitory computer-readable storage media includes that which have encoded information provided in a form that can be read (i.e., scanned/sensed) by a machine/computer and interpreted by the machine's/computer's hardware and/or software. In particular, the computer-readable storage media may include local or remote memory storage devices that include a local hard disk, a floppy disk, a CD-ROM or DVD, RAM, ROM, a USB memory device, and remote memory storage devices. The computer or processor may also be electronically coupled to one or more other analytical instruments as well as output devices, such as display screens, printers, and the like and/or one or more input devices, such as keyboards, pointing devices, styluses, touchscreens, network connections, and the like. Thus a computer or processor coupled to the mirror bearing disclosed herein can orchestrate the control of the mirror bearing, which may be incorporated into an interferometer as discussed above.

Overall aspects of the disclosure are directed to mirror bearings for analytical instruments such as interferometers all of which may be associated with improvements in the mirror bearing. The mirror bearing described herein provides various advantages over other types of interferometer mirror bearings, some of which include having a relatively smaller size/weight/footprint, having parts with a good strength-to-weight ratio, having relatively fewer parts, having a relatively lower cost of production, having parts with good wear characteristics throughout the useful life of the disclosed mirror bearing, and others that will be appreciated upon review of the disclosures herein. Those having skill in the art, with the knowledge gained from the present disclosure, will recognize that various changes can be made to the disclosed devices and methods in attaining these and other advantages, without departing from the scope of the present disclosure. Accordingly, it should be understood that the features described herein are susceptible to changes or substitutions. The specific embodiments illustrated and described herein are for illustrative purposes only, and not limiting of the subject matter as set forth in the appended claims.

What is claimed is:

1. A mirror bearing for an interferometer, the mirror bearing comprising:
   a mounting member configured for rigid coupling to the interferometer at a first end of the mounting member and comprising:
      a bore extending through the mounting member along a longitudinal axis of the mounting member, and
      a drive coil receiving area configured to hold, in a fixed position, a drive coil coupled to the mounting member at the drive coil receiving area; and
   a mobile mirror assembly comprising:
      a tube configured to receive, through a first end of the tube, a second end of the mounting member disposed opposite the first end of the mounting member, wherein the tube is configured for slidable movement relative to the mounting member along the longitudinal axis,
      a mirror coupled to a second end of the tube opposite the first end of the tube, and
      a drive magnet coupled to the mirror and disposed within the tube wherein the drive magnet is configured to be received through the second end of the mounting member and disposed within the bore of the mounting member.

2. The mirror bearing of claim 1, wherein a first diameter of the mounting member at the drive coil receiving area is less than a second diameter of the mounting member at the first and second ends of the mounting member, and wherein a conductive wire of the drive coil is wrapped around the drive coil receiving area.

3. The mirror bearing of claim 1, further comprising a repulsion magnet disposed within the bore of the mounting member near the first end of the mounting member, and wherein the repulsion magnet provides a repelling force against the drive magnet in a direction away from the first end of the mounting member and toward the second end of the mounting member.

4. The mirror bearing of claim 3, further comprising a position adjuster for the repulsion magnet, and wherein the position adjuster is configured to adjust a position of the repulsion magnet along the longitudinal axis of the mounting member.

5. The mirror bearing of claim 3, further comprising a stopping member that limits movement of the mobile mirror assembly in a direction away from the first end of the mounting member and toward the second end of the mounting member.

6. The mirror bearing of claim 1, wherein the first end of the mounting member comprises a flange configured to couple the mounting member to a body of the interferometer.

7. The mirror bearing of claim 1, wherein the mounting member further comprises a flange positioned between the first end of the mounting member and the drive coil receiving area, and wherein the flange is configured to support the first end of the tube of the mobile mirror assembly when the mounting member is disposed within the tube.

8. The mirror bearing of claim 1, wherein the mounting member defines a hole in a side wall of the mounting member and positioned between the first end of the mounting member and the drive coil receiving area, and wherein the hole is configured to provide passage of a wire lead of the drive coil from the drive coil receiving area into the bore of the mounting member.

9. The mirror bearing of claim 1, wherein the mobile mirror assembly further comprises an anti-rotation magnet coupled to an outer surface of the tube of the mobile mirror assembly, and wherein the anti-rotation magnet is configured to prevent unwanted rotation of the mobile mirror assembly around the longitudinal axis of the mounting member.

10. The mirror bearing of claim 1, wherein the mounting member has a monolithic construction.

11. The mirror bearing of claim 1, wherein the mounting member and the tube of the mobile mirror assembly are each entirely constructed of non-dusting graphite.

12. The mirror bearing of claim 1, wherein the mounting member is coupled directly to a body of the interferometer.

13. The mirror bearing of claim 1, wherein the tube of the mobile mirror assembly has an inner diameter that minimizes a space between an outer surface of the mounting member at the first end and an inner surface of the tube.

14. The mirror bearing of claim 13, wherein:
the first end of the mounting member has an outer diameter of about 0.420 inches.

15. The mirror bearing of claim 1, wherein:
the mounting member has an overall length of about 1.500 inches; and
the tube of the mobile mirror assembly has an overall length of about 1.375 inches.

16. The mirror bearing of claim 1, wherein:
a surface of the mirror of the mobile mirror assembly is substantially perpendicular to the longitudinal axis of the mounting member.

17. The mirror bearing of claim 1, wherein the mirror bearing is oriented horizontally relative to ground when installed in the interferometer.

18. An interferometer comprising:
a mirror bearing comprising:
a mounting member configured for rigid coupling to the interferometer at a first end of the mounting member and comprising:
a bore extending through the mounting member along a longitudinal axis of the mounting member, and
a drive coil receiving area configured to hold, in a fixed position, a drive coil coupled to the mounting member at the drive coil receiving area; and
a mobile mirror assembly comprising:
a tube configured to receive, through a first end of the tube, a second end of the mounting member disposed opposite the first end of the mounting member, wherein the tube is configured for slidable movement relative to the mounting member along the longitudinal axis,
a mirror coupled to a second end of the tube opposite the first end of the tube, and
a drive magnet coupled to the mirror and disposed within the tube wherein the drive magnet is configured to be received through the second end of the mounting member and disposed within the bore of the mounting member.

19. A mirror bearing for an interferometer, the mirror bearing comprising:
a mounting member configured for rigid coupling to the interferometer at a first end of the mounting member and comprising:
a bore extending through the mounting member along a longitudinal axis of the mounting member, and
a drive coil coupled to the mounting member; and
a mobile mirror assembly comprising:
a tube configured to receive, through a first end of the tube, a second end of the mounting member disposed opposite the first end of the mounting member, wherein the tube is configured for slidable movement relative to the mounting member along the longitudinal axis,
a mirror coupled to a second end of the tube opposite the first end of the tube, and
a drive magnet coupled to the mirror and disposed within the tube wherein the drive magnet is configured to be received through the second end of the mounting member, disposed within the bore of the mounting member, and positioned proximate to the drive coil.

20. The mirror bearing of claim 19, wherein the mirror bearing is oriented vertically or at an angle between horizontal and vertical.

21. The mirror bearing of claim 19, further comprising a repulsion magnet disposed within the bore of the mounting member near the first end of the mounting member, and wherein the repulsion magnet provides a repelling force against the drive magnet in a direction away from the first end of the mounting member and toward the second end of the mounting member, and wherein the repelling force provided by the repulsion magnet is sufficient to position the mobile mirror assembly at a predetermined location along the mounting member without providing power to the drive coil.

22. The mirror bearing of claim 21, wherein the predetermined location is controllable using the repulsion magnet.

* * * * *